United States Patent [19]
Murphey et al.

[11] Patent Number: 6,143,698
[45] Date of Patent: Nov. 7, 2000

[54] METHOD FOR REMOVING FILTERCAKE

[75] Inventors: Joseph R. Murphey, Spring; Jeffrey S. McKennis, The Woodlands; Keith W. Sharp, Houston, all of Tex.

[73] Assignee: Tetra Technologies, Inc., The Woodlands, Tex.

[21] Appl. No.: 09/206,077

[22] Filed: Dec. 4, 1998

Related U.S. Application Data

[63] Continuation-in-part of application No. 09/127,842, Aug. 3, 1998.

[51] Int. Cl.$^7$ .............................. C09K 7/02; E21B 21/00; E21B 43/04
[52] U.S. Cl. ......................... 507/145; 507/141; 507/272; 507/276; 507/277; 166/312; 166/278
[58] Field of Search ..................................... 507/141, 145, 507/272, 276, 277; 166/312, 278

[56] References Cited

U.S. PATENT DOCUMENTS

| | | | |
|---|---|---|---|
| 1,984,668 | 12/1934 | Wier et al. | 166/21 |
| 2,221,353 | 11/1940 | Limerick et al. | 166/21 |
| 3,167,510 | 1/1965 | Alter | 252/8.55 |
| 3,816,151 | 6/1974 | Podlas | 106/194 |
| 3,818,991 | 6/1974 | Nimerick | 166/283 |
| 3,922,173 | 11/1975 | Misak | 106/194 |
| 4,144,179 | 3/1979 | Chatterji | 252/8.55 |
| 4,259,205 | 3/1981 | Murphey | 252/326 |
| 4,465,598 | 8/1984 | Darlington | 210/721 |
| 4,552,674 | 11/1985 | Brown et al. | 252/8.55 |
| 4,560,486 | 12/1985 | Hinkel | 252/8.55 |
| 4,591,443 | 5/1986 | Brown et al. | 210/747 |
| 4,594,170 | 6/1986 | Brown et al. | 252/8.55 |
| 4,609,475 | 9/1986 | Hanlon et al. | 252/8.55 |
| 4,610,795 | 9/1986 | Norris et al. | 252/8.551 |
| 4,941,537 | 7/1990 | Langemeier et al. | 166/308 |
| 4,969,526 | 11/1990 | Cawiezel | 166/300 |
| 5,054,552 | 10/1991 | Hall et al. | 166/278 |
| 5,055,209 | 10/1991 | Bridges et al. | 252/8.51 |
| 5,143,157 | 9/1992 | Harms | 166/300 |
| 5,247,995 | 9/1993 | Tjon-Joe-Pin et al. | 166/312 |
| 5,253,711 | 10/1993 | Mondshine | 166/300 |
| 5,386,874 | 2/1995 | Laramay et al. | 166/300 |
| 5,447,199 | 9/1995 | Dawson et al. | 166/300 |
| 5,501,276 | 3/1996 | Weaver et al. | 166/291 |
| 5,607,905 | 3/1997 | Dobson, Jr. et al. | 507/211 |
| 5,759,964 | 6/1998 | Shuchart et al. | 507/209 |

*Primary Examiner*—Philip Tucker
*Attorney, Agent, or Firm*—Jo Katherine D'Ambrosio

[57] ABSTRACT

A method for removing filtercake from a subterranean borehole comprising drilling the borehole with a drilling fluid that includes additives to form a filtercake having an oxidation-degradable component, preferably a polysaccharide. The filtercake is contacted with a clear brine containing bromine or bromate generating agents to degrade the polymers within the filtercake. The brine contains bromide salts and an oxidant capable of delayed oxidation of the bromide to bromine at downhole conditions.

20 Claims, No Drawings

METHOD FOR REMOVING FILTERCAKE

CROSS REFERENCE TO RELATED APPLICATION

This application is a continuation-in-part of U.S. Ser. No. 09/127,842 filed Aug. 3, 1998, pending.

FIELD OF THE INVENTION

The present invention relates to a method for removing filtercake from a subterranean borehole, particularly to a method for filtercake removal by contacting the filtercake with a precursor to an oxidizing agent and more particularly to a method of filtercake removal in which the oxidizing agent is bromine and/or bromate.

BACKGROUND OF THE INVENTION

The walls of oil and gas formations are exposed during the process of drilling a borehole. The successful completion of a wellbore requires the deposit of a low-permeable filtercake on the walls of the wellbore to seal the permeable formation exposed by the drilling bit. A filtercake can limit drilling fluid losses from the wellbore and protect the natural formation from possible damage by the fluids permeating into the wellbore. Solids in the drilling fluid may also damage the formation, particularly drilling fines. The suspension of fine particles that enters the formation while the cake is being established is known as "mud spurt" and the liquid that enters subsequently is known as "filtrate". Both filtration rate and mud spurt must be minimized when penetrating potentially productive formations because productivity may be reduced by any one of the following: the swelling of clays in the formation when they come in contact with the filtrate; particles transported into the pores of the formation that plug flow channels and greatly reduce the permeability of the rock; and the pressure of some reservoirs that is not great enough to drive all of the aqueous filtrate out of the pores of the rock when the well is brought into production.

Contamination of the formation with drill solids in the fluids can be avoided by formulating the drilling fluid with other soluble solids that can be incorporated in the filtercake and dissolved at a later time, thereby diluting the effect of the insoluble solids. Sized salt solids, in salt saturated solutions, and finely ground calcium carbonate are examples of solids purposely added to the drilling, workover, or completion fluids to form a filtercake that can later be partially dissolved by aqueous or acid flushes.

For a filtercake to form, the drilling fluid must contain some particles of a size only slightly smaller than the pore openings of the formation. These particles are known as bridging particles and are trapped in surface pores, thereby forming a bridge over the formation pores. Filtercake building fluids can also contain polymers for suspension of solids and for reducing liquid loss through the filtercake by encapsulating the bridging particles. These can be either natural or synthetic polymers. The polymers can include one polymer such as xanthan selected for its rheological properties and a second polymer, a starch for example, selected for reduction of fluid loss.

At completion of the drilling or other well servicing, the filtercake must be removed to allow production of the formation fluids or bonding of cement to the formation at the completion stage. Removal of the deposited filtercake should be as complete as possible to recover permeability within the formation.

Previous chemical treatments for filtercake removal have employed an acid to dissolve carbonates and/or hydrolyze polysaccharide polymers. Dobson, Jr. et a., U.S. Pat. No. 5,607,905, reveal a process for enhancing the removal of filtercake by the use of inorganic peroxides as oxidizing agents. The process disclosed in the '905 patent incorporates alkaline earth metal peroxides, zinc peroxides or a mixtures thereof within the filtercake as an integral component thereof and then contacts the filtercake with an acidic solution. Weir et al., U.S. Pat. No. 1,984,668, disclose a method of cleaning the walls of mudded boreholes. A first reagent is included in the mud-coating of the borehole. Subsequently, the mud-coating is impregnated with a second reagent that reacts with the first reagent. The first reagent is generally a carbonate. The second reagent is generally an acid that reacts with the carbonate to form carbon dioxide gas.

Tjon-Joe-Pin et al., U.S. Pat. No. 5,247,995, disclose a method for removing a polysaccharide-containing filtercake formed on surfaces during fracturing with a viscosified fluid. The '995 method discloses removal of the filtercake by pumping downhole an aqueous fluid containing enzymes that degrade polysaccharide. The use of non-metallic persulfates as an oxidant in filtercake removal systems is also disclosed.

A composition and method of removing polymeric material from a formation is found in Hanlon, U.S. Pat. No. 4,609,475. The method disclosed comprises contacting the formation with an oxidizing agent and carboxylic acid. A source said to be effective in promoting the decomposition of the oxidizing agent is added to the aqueous solution containing the oxidizing agent.

A high viscosity fracturing fluid containing gel breaking additives above 200° F. is disclosed in Shuchart et al., U.S. Pat. No. 5,759,964. The gel breaking additive is a bromate ion releasing compound such as alkali or alkaline earth metal bromate.

The addition of an alkali metal or alkaline earth metal salt of hypochlorous acid, or a chlorinated isocyanurate is disclosed in Langemeier et al., U.S. Pat. No. 4,941,537, for the reduction of viscosity of aqueous fluids thickened with a tertiary amino polygalactomannan.

Methods of filtercake removal that incorporate a solid oxidizing agent precursor in the filtercake are not totally insoluble at the temperatures of application so that some oxidizing materials are released with premature degrading of the polymer. Also, the materials are only applicable in high pH fluids, thereby limiting their use. Finally, these compositions cannot be used in formulations with significant amounts of reducing agents, such as iron control agents, oxygen scavengers, or bromide or formate brines.

A problem associated with the use of acid to activate a precursor in field use is that sufficient acid does not always contact all parts of the filtercake. Sometimes the acid must be "weighted up" (formulated with high weight brines to increase fluid density). Thus the actual acid content is low. As the acid is reacting with the carbonates in the filtercake, a stoichiometric amount of acid is required, and this volume can be greater than the actual exposed wellbore volume; the acid must be continuously replaced. In some cases, the acid initially dissolves a small region of the filtercake, because of the vastly increased fluid loss of this region, the remaining acid flows to this small region and out into the formation. What is needed is a method that attacks the filtercake in a manner which does not completely remove the filtercake in a small region and does not require large stoichiometric amounts of agent.

In the drilling and completion of a well, several operations after the drilling process are often required before production can begin. These operations require the displacement of the drilling fluid without degradation or removal of the filtercake. What is needed, therefore, is a method for removal of filtercake that does not depend on the presence of a drilling fluid.

In the case of horizontal open hole drilling of unconsolidated formations, it is desirable to gravel pack the wellbore after drilling the zone but before the filtercake is completely removed. The problem is that the act of gravel packing the wellbore annulus further limits acid contact with the filtercake, as it both reduces the physical volume of acid in the zone and blocks its flow.

Consequently, there remains the need for a filtercake removal technology that does not depend solely on acid hydrolysis for removal of the filtercake. And there is an additional need to provide a method for oxidizing filtercake materials in which the oxidizing agent is not activated prematurely, i.e. at ambient temperatures, so that the oxidizing agent works in concert with drilling fluid formulations that have easily oxidized materials.

SUMMARY OF THE INVENTION

In the method of this invention, the removal of a filtercake from a subterranean borehole comprises the steps of drilling the borehole with a drilling fluid to form a filtercake comprising an oxidation degradable component, contacting the filtercake with a filtercake removed fluid, allowing the filtercake removal fluid to remain at the downhole temperature for a period of time effective to form an oxidizing agent to degrade the oxidation-degradable component and decompose the filtercake, and flushing away the decomposed filtercake. The oxidation-degradable component can be a polymer. The oxidizing agent can be a bromate or bromine generating agent.

In a preferred embodiment, the present invention provides a filtercake removal fluid for cleaning a borehole drilled in the earth. The filtercake removal fluid comprises a clear brine comprising a halide salt and having a density of at least 9 lb/gal (1.08 g/cm$^3$), preferably at least 12 lb/gal (1.44 g/cm$^3$), and a bromine or bromate generating agent dispersed in the brine. The halide salt is preferably a bromide salt, in which case the bromine/bromate generating agent comprises an oxidant in an amount effective to oxidize the bromide ion to bromine. Suitable oxidants are bromates, chlorates, hypochlorites, permanganates, peroxides and the like. Where the brine is essentially free of bromide, e.g. based on chloride salts, the oxidant is a bromate or a bromate generating agent. The bromine/bromate filtercake removal fluid can include a surfactant to facilitate wetting of the filtercake, and can also include up to about 70 lb/bbl of finely divided solids. The brine preferably comprises a halide salt of a metal such as, for example, alkali metals, alkaline earth metals, transition metals, or the like. The pH of the bromine/bromate filtercake removal fluid is preferably in the range of from 3 to 7 in order to facilitate bromine formation at downhole temperature and pressure conditions, but minimize bromine formation at surface conditions. The bromine/bromate filtercake removal fluid is also useful in a method for preparing a borehole in the earth for hydrocarbon production therefrom. This method comprises drilling the borehole while circulating a mud therein which comprises a polysaccharide and optionally comprises finely divided solids dispersed therein to form a filtercake on the surface of the borehole, and then circulating the bromine/bromate filtercake removal fluid through the borehole in contact with a subterranean formation containing the hydrocarbons to be produced for a duration effective to substantially removal the filtercake in the vicinity of the subterranean formation.

Preferably, the polymer in the filtercake comprises a polysaccharide such as, for example, starch, cellulose or xanthan. In one embodiment, organic hydroperoxide is thermally activatable at the borehole temperature of the filtercake. In a preferred embodiment, the organic hydroperoxide is t-butylhydroperoxide and the borehole temperature is at least about 80° C. Alternatively, the organic hydroperoxide is selected from the group consisting of cumene hydroperoxide, t-butyl dihydroperoxide, and amylhydroperoxide, and the borehole temperature is at least about 80° C.

In one embodiment, an activating agent for the organic hydroperoxide is flushed over the filtercake prior to the organic hydroperoxide flush. In an alternative embodiment, the filtercake comprises an activating agent for activating the organic hydroperoxide. Preferably, the activating agent comprises an ascorbic acid. Alternatively, the activating agent comprises a tertiary amine. In another embodiment, activating agent is diethylaminoisopropanol. Alternatively, the tertiary amine comprises triethanolamine. In one aspect, the activating agent is a polymer comprising pendant tertiary amine moieties. The oxidation-degradable polymer is functionalized with the amine moieties. An additional activating agent selected from the group consisting of copper salt solution cobolt salt solution, iron salt solution and chromium salt solution is flushed over the filtercake.

In one preferred method for removing filtercake from a subterranean borehole, the steps for removal of the filtercake comprise drilling the borehole with a drilling fluid to form a filtercake comprising an oxidation-degradable component and an activating agent for activating a precursor of an oxidizing agent, wherein the filtercake is free of the precursor, contacting the filtercake with a precursor of an oxidizing agent, allowing the precursor to remain in contact with the filtercake to form an oxidizing agent to degrade the oxidation-degradable agent and decompose the filtercake, and flushing away the decomposed filtercake. Preferably, the oxidation-degradable component is a polymer. The polymer can comprise starch, cellulose or xanthan. The activating agent can comprise a tertiary amine. Preferably, the tertiary amine comprises triethanolamine. Alternatively, the activating agent is a polymer comprising pendant tertiary amine moieties. The oxidation-degradable polymer can be functionalized with the amine moieties. In one aspect, the precursor is selected from alkali metal and ammonium salts of persulfates, perborates, permangamates and percarbonates. Alternatively, the precursor is selected from the group consisting of t-butyl hydroperoxide, cumene hydroperoxide, t-butyl dihydroperxoide, and amylhydroperoxide. Preferably, the steps for this preferred method include: installing gravel pack screens and tool assemblies into the borehole prior to the step of contacting the filtercake with the precursor, determining fluid losses and adding sand in a nonviscosified carrier to the borehole.

DETAILED DESCRIPTION OF THE INVENTION

In the method of this invention, filtercake formed on the walls of a subterranean borehole is removed by contacting the filtercake with a precursor to an oxidizing agent which forms the oxidizing agent in situ to degrade the polymer component of the filtercake. Filtercakes are tough, almost water insoluble coatings that reduce permeability of formation walls. Formed during the drilling stage to limit losses from the wellbore and protect the formation from possible damage by fluids and solids within the wellbore, filtercake layers must be removed from the hydrocarbon-bearing formation so that the formation wall is restored to its natural permeability to allow for hydrocarbon production or cementing.

Filtercakes are typically formed with polymers that encapsulate particles or solids which form a bridge over the pores of the formation. Drill-in fluids, including any bridging agents and polymers, especially polysaccharides, contained within the drilling fluid are well known in the art. In the method of this invention, the preferred drilling fluid is a brine, more preferably, a calcium bromide brine with additives, preferably polymers, salts, carbonates and other soluble solids. An example of a suitable drilling fluid according to the present invention comprises a calcium bromide brine with a cationic starch, a cross-linked, non-cationic starch, sodium thiosulfate, magnesium oxide, and xanthan biopolymer. The bridging agent within the drilling fluid may include either water soluble or acid soluble materials, for example: sized salt solids in salt saturated solutions, finely ground carbonates found in limestone, marble, or dolomite; or oil soluble such as resins, waxes and the like. Polymers can be either natural or synthetic polymers. Preferred polymers comprise starches and xanthans. Alternatively, the polymer can be selected from starch derivatives, cellulose derivatives and biopolymers such as hydroxypropyl starch, hydroxyethyl starch, carboxymethyl starch and their corresponding crosslinked derivatives; carboxymethyl cellulose, hydroxyethyl cellulose, hydroxypropyl cellulose, methyl cellulose, dihydroxypropyl cellulose, and their corresponding crosslinked derivatives; xanthan gum, gellan gum, welan and the like.

In the drilling and completion of a well, several operations may be required after the drilling process before the well is produced. For these stages it is usually desirable to maintain the filtercake on the wellbore thereby limiting fluid losses to the formation. Immediate degradation or removal of the filtercake is not desired. The drilling or completion fluid is displaced without removing the filtercake. Known procedures which are designed to achieve this displacement are believed to be compatible with the invention. In other situations, such as the cementing of a cased hole, the drilling fluid and the filtercake are removed together. The preferred practice is to use a spacer fluid to completely displace the drilling fluid first, and then treat to remove the filtercake.

According to the filtercake removal method of this invention, a filtercake is formed with an oxidation-degradable component, preferably a polymer, especially a polysaccharide, as described above. Oxidizing agents, or preferably precursors to oxidizing agents, attack and decompose the oxidation-degradable component. In one embodiment of the method of filtercake removal, the filtercake is treated or flushed with a precursor to an oxidizing agent, for example an organic peroxide or hydroperoxide. Preferably the precursor remains in contact with the filtercake as a soak for a time period of from one to six or more hours. Preferably the organic peroxide or hydroperoxide is soluble or dispersible in aqueous mixtures and relatively inert at ambient temperatures. Because of these properties, the organic peroxide or hydroperoxide can be included in the final treating flush of weighted brines with little oxidation of the halide to the free element. At downhole temperatures, however, the oxidative activity increases. Organic peroxides and hydroperoxides are selected for the characteristic of increasing reactivity with increasing temperature. Commercially, they are described as having a declining half-life at various increasing temperature that correspond to this increasing oxidative activity. Consequently the preferred precursor to an oxidizing agent is selected so that an oxidizer is rapidly generated at reservoir formation temperatures although stable in storage at ambient conditions.

Preferred precursors having such properties comprise t-butylhydroperoxide, tertiary dibutyl hydroperoxide, cumene hydroperoxide, or amyl-hydroperoxide, especially t-butylhydroperoxide. They can be used as precursors in dilute concentrations. Some chlorite solutions are also stable until activated at particular temperatures, including chlorinated isocyanurates, such as, for example, dichloro-s-triazine-2,4,6-trione or dichloroisocyanuric acid. Thus the formation temperature activates the precursors in the degradation of filtercake. Preferably, the formation or borehole temperature is at least 80° C.

In one embodiment of the invention bromine or a bromate is used to break down the polysaccharides in the filtercake, either by using a bromate in the flush fluid, or by using a bromide-based brine for the flush with an oxidant capable of oxidizing the bromide to bromine. The elemental bromine is then subjected to disproportionation reactions to form hypobromite and bromate species. It is not understood whether elemental bromine, which is an efficient oxidizer or polysaccharides by itself, or bromate species involved in equilibrium with bromine, or perhaps both, are the active polysaccharide oxidant. The invention is not to be bound by theory, and any bromine or bromate generating species can be employed. Bromate or another bromate generating agent at downhole conditions can be used. Preferably, the filtercake removal fluid comprises a heavy brine containing bromide and an oxidant capable of oxidizing the bromide to bromine in situ. Bromide salts of any alkali metal, alkaline earth metal or transition metal can be used, for example, calcium or zinc bromide. Mixtures of bromide and chloride salts can also be used. Oxidants which can be used in this bromide embodiment include bromates, chlorates, hypochlorites, permanganates, peroxides and the like. The bromate/bromine filtercake removal method can be kept at a pH which inhibits bromine formation at surface conditions and promotes bromine formation at downhole conditions. For example, the filtercake removal fluid can be prepared at a pH of about 7, and then acidified before or after introduction to the wellbore to a pH of about 3 to promote bromine formation.

In another embodiment of this invention, the filtercake is flushed with a fluid containing a catalyst prior to the soak with a precursor. The catalyst functions as an activating agent for forming the oxidizing agent from the precursor. Various activating agents can be selected to catalyze the decomposition of precursors. Preferably, specific catalysts are used with specific precursors, for example, tertiary amines and ascorbic acid act as catalysts to degrade t-butylhydroperoxide. In one aspect, the catalyst is included in the drilling fluid displacement stage and the oxidizing precursors are then included in a later flush or flushes intended to dissolve and disperse the filtercake. The later flushes can include surfactants and other materials designed to displace the polymeric components from the surfaces of the drill solid materials, such as, for example, lactose or methyl glycoside.

Oxidizing agents formed from the precursors attack polymers encapsulating the bridging particles and break down the filtercake by removing the polymeric coat, with the effect that the residual filtercake solids are no longer bridged or bonded by polymers. Preferably, the polymer is completely dissolved so that the carbonate particles do not bond to each other. These bridging solids can then easily be dispersed as individual particles, not clustered films. The removal of the filtercake particles can then occur either particle by particle as production fluid flows out of the formation into the wellbore, or by the addition of a solubilizing flush to dissolve the bridging solids. Although no acid is required, since the filtercake particles are small enough to flow through as production fluids flow into the bore, an acid flush is preferably injected into the bore to dissolve the carbonate bridging component. The acid can be applied immediately, or alternatively, flushed over the filtercake at a later time. Alternatively, the acid can be generated in place, for example, by the decomposition of a polyglycolic acid.

In an alternative embodiment, a catalyst or activating agent for the precursor is incorporated into the filtercake. The catalyst is included in the drilling fluid along with other filtercake building materials to deposit into the filtercake as it is formed. Oxidation of the filtercake occurs when a precursor is flushed over the filtercake and decomposes upon activation by the catalyst, into an oxidizing agent. Even though the catalyst is within the filtercake, no oxidative attack on the polymers of the filtercake takes place until the filtercake is contacted with the oxidizing precursor. Specific catalysts are used with specific precursors as described above, preferably tertiary amines or ascorbic acid with t-butylhydroperoxide. Preferably, the catalyst is chemically bonded as an adduct with targeted polymers, tertiary amines as adducts on starches or xantham for example. For that reason, the decomposition of the oxidizing precursor occurs locally, in the molecular region where the oxidative attack of the polymer is desired.

In one aspect, the catalyst is a tertiary amine or aminoalkand, such as, for example, triethanolamine, diethylaminoisopropanol, or the like. In another embodiment, the catalytic materials are polymeric and become part of the polymeric component of the filtercake, as functional moieties dependent from the polymeric backbone e.g., thereby limiting catalyst loss with brine or fluids that are lost to the formation from the filtercake building fluid. Preferably, the catalytic moiety can be a component of one or any combination of the polymers chosen for use in the formation. The activating agent or catalyst can be a polymer comprising pendant tertiary amine moieties. One preferred activating agent comprises an amine adduct to a starch or viscosifying polymer. In a preferred embodiment, the catalyst is a diethylaminoisopropanol adduct to either a starch or xanthan.

When the catalyst or activating agent is incorporated within the filtercake, decomposition of the filtercake begins as the precursor is placed in contact with the filtercake and then remains in contact as a soak until the filtercake is decomposed. Preferably, the precursor is one that is stable at ambient temperatures and decomposes to the oxidizing agent at downhole temperatures, between 40° C. and 120° C. The oxidizing agent breaks down the polymeric coating on the carbonate particles of the filtercake thereby destroying the bridging feature of the filtercake. The particles can be further reduced or dissolved by the use of a separate acid wash after the precursor soak.

In a preferred method of filtercake removal, a well is drilled using a drilling fluid that includes an amine-substituted starch and an amine-substituted xanthan thickening agent. Preferably the amine is diethylaminoisopropanol. Alternatively, a polymer containing tertiary and quaternary functional groups, such as a copolymer of polyethylenimine and ethylene oxide may be included. The preferred amounts of polymer are 0.14 g/l to 28.6 g/l. The fluid preferably contains about 85.7 g/l of sized carbonate, as well as drill solids resulting from the drilling operations. Other additives, such as gel stabilizers, clay treating additives, pH control agents, antioxidants, lubricants, non-emulsifying agents, iron control agents and the like can be included as desired.

Following the drilling of a well, when fluid losses are acceptable for the proposed pumping pressures, gravel or sand packing can begin. First the drill-in fluid is displaced with a first clear fluid, which is otherwise similar to the drilling fluid. The wellbore is maintained in a slightly overbalanced state. Gravel pack screens and tool assemblies are run into the bore. During this stage, it is desirable to maintain the filtercake with as little fluid loss to the production formation as possible. Following displacement of the drilling fluid, the well is gravel packed. In a preferred procedure, the gravel, preferably sized sand, about 20–30 U.S. mesh, is placed into a nonviscosified carrier, such as a brine. As the low viscosity fluid cannot transport a significant amount of solids, the sand concentrations are usually from about 60 g/l to 360 g/l and pump rates approach 1 $m^3$/min. The hydrostatic overbalance that arises from the pumping pressure necessary to achieve these rates is desirable since the overbalance holds the filtercake in place. An oxidative precursor, such as bromate or t-butyl hydroperoxide, can be added during the sand packing. A preferred practice starts with small concentrations, approximately 0.1–0.5%, and increases the concentration of the precursor if there are no fluid loss responses.

Once the gravel pack sand is in place, it becomes more difficult to insure contact of the filtercake with acidic or other flushes. Treating fluids, particularly acids, tend to dissolve all of the filtercake in small areas so that the remaining treating fluid leaks off, or leaves, the wellbore at those points. In one aspect of the present invention, the problem of a flush completely dissolving a small area of the filtercake is overcome by including the activator in the filtercake. The precursor is flushed in at a later time. Alternatively, the precursor of the oxidizer is included in the gravel pack carrier fluid itself, combining two treatment steps with resultant savings in rig time. In another aspect of the invention, after the drill zone is completely filled with sand and flushed with a precursor, the gravel pack can be filled with an acid-containing fluid to dissolve the carbonate.

Prior to the acid flush and after the gravel pack is in place, the first replacement fluid is usually displaced with a spacer (buffer) or series of spacers, so that a clear fluid is left in the bore. In an alternative method, this fluid can contain about 0.014 g/l to 2.86 g/l of a copper salt. The copper ions, with a strong affinity for tertiary amines, are retained in the filtercake and function as an additional activator to catalyze the breakdown of some oxidizing agents, particularly organic peroxides and hydroperoxides. Alternatively, ascorbic acid is used as the activating agent for the precursor. Ascorbic acid with the addition of the copper salt will rapidly reduce the precursor to an oxidizing agent. Other metal ions, such as cobalt, nickel, iron, and chromium could be substituted for the copper. If fluid losses are too great during this step, additional sized carbonate can be injected to reduce such losses.

The additional benefit of the copper catalytic effect is important at temperatures below 60° C. as the amines in the filtercake can catalyze the decomposition of many oxidizing precursors, including sodium persulfate and t-butyl hydroperoxide more effectively. Amines alone with no additional catalyst are sufficient above this bottom hole temperature.

Interaction of the oxidative precursors and the catalysts embedded in the filtercake generates the oxidation-degradable agent needed to decompose the polymers of the filtercake. The residual filtercake solids, no longer bridged or bonded by polymer, can be easily dispersed. The removal of the particles can then be by either particle by particle as the well is flowed in the production direction, or by a solubilizing flush such as an acid injected to dissolve carbonate. The acid can be immediately applied, squeezed at a later time, or generated in place, such as by decomposition of polyglycolic acid.

EXAMPLES

Drill in fluid formulations with a specific gravity (SG) equaling 1.44 based upon a $CaBr_2$ based brine were used for Tests 1–8.

Formulations
Drill-in Fluid Based Upon $CaBr_2$

| Component | Quantities in grams/liter Formulation # | |
|---|---|---|
| | 1 | 2 |
| Water | 424.9 | 424.9 |
| $CaBr_2$ (SG = 1.70 brine) | 920.9 | 920.9 |
| Cationic Starch | 0 | 13.7 |
| Crosslinked, Non-Cationic starch (FL7+) | 13.7 | 0 |
| Sodium Thiosulfate | 2.86 | 2.86 |
| Magnesium Oxide | 2.86 | 2.86 |
| Xanthan biopolymer | 3.14 | 3.14 |
| Sized Marble powder #1 | 16 | 16 |
| Sized Marble powder #2 | 16 | 16 |
| Sized Marble powder #3 | 2.86 | 2.86 |
| Tertiary Amine polymer, #1 | 0 | 0.29 |
| Tertiary Amine polymer, #2 | 0 | 0.29 |
| Xanthan biopolymer | 3.14 | 3.14 |

Sized Marble powder #1 ($3\mu$ to $400\mu$)
Sized Marble powder #2 ($1\mu$ to $36\mu$)
Sized Marble powder #3 ($1\mu$ to $4\mu$)
Tertiary amine polymer #1, Polyethyleneimine copolymer with ethylene diglycol
Tertiary amine polymer #2, Polyethyleneimine copolymer with epichlorohydrin The $CaBr_2$ brine was a stock commercial solution marketed by TETRA Technologies. The cationic starch used was also commercially available from TETRA Technologies as TETRA HPS. It is an epichlorohydrin crosslinked, pregelatinized corn starch which has been reacted with diethanolamino-methane. Levels of substitution are about 0.20 to 0.40 moles amine per mole amylose. The non-cationic starch was commercially obtained as FL 7 PLUS, a trademarked product of TBC-Brinadd. It is an epichlorohydrin crosslinked starch which can be substituted with propylene oxide. The sodium thiosulfate and magnesium oxide were USP grade. The xanthan biopolymer is available from several suppliers, that used was supplied by Drilling Specialties. The sized marble powders are available from TETRA Technologies under the trade designation TETRA Carb-Prime, TETRA Carb-Fine, and TETRA Carb-Ultra, respectively. The tertiary amine polymer #1 was a homopolymer of ethylene-imine with about 40% of the available nitrogen reacted with ethylene oxide. Molecular weight was 60,000–80,000. Tertiary amine polymer #2 was a homopolymer of ethylene-imine with about 40% of the available nitrogen reacted with epichlorohydrin. Molecular weight was about 40,000.

This mixing procedure was followed for all laboratory tests. After adding the starch, and before adding the next ingredients, the mixture was sheared with a high shear (Silversen type) mixer for 30 seconds, and then mixed at 500 RPM using a low shear Servodyne unit for 30 minutes. This is intended to simulate mixing with a high shear centrifugal pump, and then slow mechanical rolling of a field mixing unit. This mixing procedure was repeated after the addition of the next three ingredients, the thiosulfate, magnesium oxide and xanthan. A third mixing for 30 minutes was run after adding the carbonates and tertiary amines.

Rheological properties were then measured (heating only the sample used for testing to 40° C.), and the samples were "hot-rolled" at 93° C. in a Baroid roller oven for 48 hours. Following the 'hot rolling', the rheological properties were again tested, and the samples were then tested for "filtercake removal" in the following manner.

The permeability of a $5\mu$ Aloxite disk was first determined in both directions of flow. This test was run at 35 KPa and 21° C. Next, a filtercake was built using a standard high temperature, high pressure cell (HTHP cell). Fann Instruments and OFI, both in Houston Tex., market this equipment. The $5\mu$ Aloxite disk was used as the filtering medium and the chamber was run upside down so that any solids separating from the drill-in fluid might fall to the bottom and not become part of the filtercake. The cell itself was filled with the test drill-in fluid and a higher density fluid was run on bottom from a reservoir attached to the cell, so that the drill-in fluid might be displaced upward.

The test was run at 93° C. for 39 hours, with a squeeze pressure of 3,500 KPa applied to the fluid. The filtrate was collected and measured during this time. The objective for producing a filtercake was to allow an initial spurt fluid loss as the filtercake is building, but then have a rapid decline as the filtercake limits further fluid loss. At the end of the cake building time, the cell was cooled and pressure released. Remaining fluid was drained from the cell and the filtercake which had been formed was examined.

Following the visual examination, the chemical treatment for removal of the filtercake and recovery of the permeability of the Aloxite disk was performed. This part of the testing was run in the normal direction, with the disk (and filtercake on it) at the cell bottom and the treating fluid carefully poured in on top of it. This fluid was injected in the same direction as the drill-in fluid to simulate the injection of a clean-up fluid in field practice. Consequently the permeability determined in this direction is called the recovered injection permeability. The test is repeated in the opposite direction, again at 35 KPa and ambient temperature. This flow was in the production direction of an actual well and is called the recovered production permeability.

Test 1

A filtercake as described above was prepared using formulation #1 at 38° C. for heat aging and permeability testing. An initial soak of 3 hours was tried using a 12.4–12.6 lb/gal $CaBr_2$ brine containing 2% by weight of tertiary-butyl hydroperoxide and 0.3% of an ethoxylated nonylphenol surfactant. This soak was run at room temperature and 3500 KPa differential pressure. After 3 hours, less than 4 ml of fluid filtrate had been produced and the injection permeability was essentially zero. The cell was loaded again with 2% t-butyl hydroperoxide and the 3 hour test repeated. No additional breakthrough of fluid was noted, and permeability, both injection and production directions was less than 2%.

Test 2

A filtercake and test similar in all respects to Test I above, except that the temperature of the test was 93° C. In this case the treating fluid broke through in 45 minutes, flowing at about 1 ml/min. In about 15 minutes additional time, this rate had increased to about 5 ml/min and the test was terminated after 80 ml of the treating fluid had been displaced through the cell. The cell was allowed to cool and pressure was released. The filtercake was visually inspected and found to be composed of discrete carbonate particles with no evidence of starches or polymers. A recovered permeability test was run in the injection direction, with 34% recovered permeability. A recovered permeability test was run in the production direction, with 67% of the original permeability recovered.

Following this step and prior to an acid flush, 50 ml of an iron control agent (2-thioethanol) and 0.3% surfactant were flushed through in the injection direction. This was done as actual field practice would call for a spacer fluid to separate the oxidizing agent stages from the hydrochloric or hydrobromic acids, which are reducing in nature. Another purpose of such a stage is to complex any $Fe^{+++}$ that may have been generated. Obviously a wide variety of other agents could be used.

After this buffer or spacer stage, a 5% solution of HCl in 1.32 g/ml $CaBr_2$ was poured into the cell. The cell was sealed and pressurized to 3,500 KPa, which was intended to simulate the spotting (but not injection) of acid in a balanced hydrostatic condition. After 3 hours, the bottom valve was opened and the acid flushed from the cell. It was noted that the time of this acid soak was one half that of the acid soaks in Tests 6 and 7 below, and only one acid soak was required. The recovered permeability was 91% in the production direction and 95% in the injection direction.

Test 3

A test similar to Test 1 was run, except in this case, formulation #2 was used; this included a cationic starch as well as amine polymers. Small amounts of fluid broke through after about 2 hours. The total fluid loss was about 30 ml during the first three hour test run. After the first 3 hour run, the cell was opened, emptied of treating solution, and a fresh 60 ml of treating solution added. Again, slow fluid loss was noted at 72.5 MPa and 38° C. over the next 3 hours resulting in a total of 30 ml displaced from the cell. Visual inspection of the filtercake showed that a top layer of the polymer had been dissolved, though not completely through. This was in contrast to Test 1 that showed no such polymer attack. Permeabilities were less than 2% in both directions. Again, an iron control agent was added as in Test 2. Following this step, the cell was loaded with a 5% HCl in 1.34 g/ml $CaBr_2$ brine and allowed to soak for 6 hrs. Recovered permeability in the injection direction was 4%. After a second, similar 6 hour acid soak, recovered permeabilities were 77% in the production direction and 72% in the injection direction.

Test 4

A test similar to Test 1 using formulation #1, except that heat aging, filtercake build-up and treatment soaks were performed at 65° C. After 3 hours, no significant leak-off of fluid had been observed. The test chamber was refilled with a fresh 2.3% solution and the test run for another 3 hours. During the final hour of this test, fluid began to leak off, amounting to about 50 ml at the end of the test. The filtercake was powdery on top and the polymer appeared to be completely removed. Permeabilities were run in both directions, with the recovered injection permeability being 3% and the recovered production permeability being 37%.

Following this test, a mixture of 5% HCl in 1.34 g/ml $CaBr_2$ was loaded in the chamber for 6 hours—as described in Test 2. Recovered permeabilities following this treatment were 23% in the injection direction and 54% in the production direction.

Test 5

A test similar to Test 4 above was run, however in the formulation included amine substituted polymers with the substituted starch. The formulations were the same as those described in Test 3 using formulation #2. Heat aging, filtercake build-up, and precursor soaks (as well as acid soaks) were again run at 66° C. Fluid breakthrough was noted just after a second 3 hour soak, as fresh 2.3% t-butyl hydroperoxide was started, and then stopped after the first hour (4 hours total) when fluid totaled 60 ml. The injection recovered permeability was 4% and the production recovered permeability was 45%. Following a single 6 hour acid soak similar to that in Test 4, the recovered permeabilities were 89% in the injection direction and 72% in the production direction.

Test 6 (for comparison to Test 2)

A test using formulation #1 was prepared, heat aging, filtercake build-up, and acid soaks were run at 93° C. No oxidizer or oxidative precursor was included. Recovered permeability after a 6-hour soak with a 5% HCl solution in 1.34 g/ml $CaBr_2$ brine at 93° C. was less than 50% in both directions. After a second 6 hour treatment with fresh acid solutions, the recovered permeability was 92% in the injection direction and 90% in the production direction.

Test 7 (also for comparison to Test 2)

A test using formulation #2 was prepared, heat aging, filtercake build-up, and acid soaks were run at 93° C. No oxidizer or oxidative precursor was run. Recovered permeability after a 6-hour soak with a 5% HCl solution in 1.34 g/ml $CaBr_2$ brine at 93° C. was less than 50% in both directions. After a second 6 hr. treatment with fresh acid solutions, the recovered permeability was 88% in the injection direction and 93% in the production direction.

Test 8 (for comparison to Tests 1 and 3)

A filtercake as described above was prepared using formulation #1 at 38° C. for heat aging and permeability testing. Two soaks of 6 hours each were run using 5% HCl in 1.34 g/ml $CaBr_2$ brine at room temperature and 3,500 KPa differential pressure. After the second soak, some acid was displaced through the Aloxite disk and permeabilities were tested. These were essentially zero in both directions. The cell was loaded again with 5% HCl in 1.34 g/ml $CaBr_2$ brine and a third 6 hour soak repeated. Recovered injection permeability was 81% and recovered production permeability was 90%.

Test 9 (with field-used drill-in fluid)

A drill-in fluid used in the field was used for this test. The fluid was originally composed of 0.94 bbl of 12.1 lb/gal $CaBr_2$ brine (164.5 lb of $CaBr_2$, 312.3 lb of water), 1 lb/bbl of magnesium oxide, 0.5 lb/bbl sodium thiosulfate, 1.25 lb/bbl xanthan gum (gelling agent XCD from Kelco), 4.8 lb/bbl of TETRA HPS starch and 30 lb/bbl sized carbonate. After use in drilling, the fluid was contaminated with 7.6 lb/bbl of drill solids composed primarily of sodium shales. A mixture of samples taken over 2 days drilling and 1000 feet of hole was used.

The field-used drilling fluid was tested to build a filtercake in the HTHP cell pressured to 300 psi nitrogen at 205° F. while stirring at 300 rpm for 39 hours. Fluid losses during this time totaled about 30 ml. The excess drilling fluid was drained out of the top of the cell and then a filtercake cleanup fluid was added. The cleanup fluid was a 12 lb/gal $CaBr_2$ brine with the equivalent of 24.4 lb/bbl sodium bromate and 3 lb/bbl (0.4 gal/bbl) of TETRA PZ-1320 nonionic surfactant. With the bottom valve closed, the cleanup fluid was heated to 206° F. for 2 hours under a nitrogen pressure of 300 psi. There was no fluid loss, however, since the bottom valve was closed. After the bottom valve was nomitored by weight, diverting the fluid to a flask on an open pan balance. The results are as follow:

| Time (hours) | Fluid Loss (ml) |
|---|---|
| 0.5 | 2.2 |
| 1.0 | 4.0 |
| 1.5 | 5.8 |
| 2.0 | 8.0 |
| 2.5 | 10.3 |
| 3.0 | 14.0 |
| 3.5 | 19.7 |
| 4.0 | 33.6 |
| 4.5 | 78.9 |
| 5.0 | 181.9 |
| 5.5 | 322.6 |

Fluid loss was less than expected for 2 hours, reached 0.10 ml/min at the end of 3 hours, and began an exponential rise in about 4 hours.

Test 10 )with field-used drill-in fluid)

Test 9 was repeated except that 16 lb/bbl of sodium bromate was used instead of 24.4 lb/bbl. The results are as follows:

| Time (hours) | Fluid Loss (ml) |
|---|---|
| 0.5 | 0.4 |
| 1.0 | 1.0 |
| 1.5 | 1.4 |
| 2.0 | 1.7 |
| 2.5 | 2.1 |
| 3.0 | 2.8 |
| 3.5 | 4.8 |
| 4.0 | 15.8 |
| 4.5 | 66.1 |
| 5.0 | 177.4 |
| 5.5 | 305.3 |

Test 11 (with field-used drill-in fluid)

Test 9 was repeated except that 12 lb/bbl of sodium bromate was used instead of 24.4 lb/bbl. The results are as follows:

| Time (hours) | Fluid Loss (ml) |
|---|---|
| 0.5 | 7.7 |
| 1.0 | 11.0 |
| 1.5 | 14.2 |
| 2.0 | 17.5 |
| 2.5 | 25.9 |
| 3.0 | 47.3 |
| 3.5 | 79.9 |
| 4.0 | 120.6 |
| 4.5 | 157.2 |
| 5.0 | 187.2 |
| 5.5 | 218.8 |
| 6.0 | 255.8 |
| 6.5 | 302.3 |

Test 12 (with field-used drill-in fluid)

Test 9 was repeated except that 10 lb/bbl of sodium bromate was used instead of 24.4 lb/bbl. The results are as follows:

| Time (hours) | Fluid Loss (ml) |
|---|---|
| 0.5 | 0 |
| 1.0 | 0 |
| 1.5 | 0.1 |
| 2.0 | 0.4 |
| 2.5 | 0.9 |
| 3.0 | 1.6 |
| 3.5 | 2.2 |
| 4.0 | 2.7 |
| 4.5 | 3.3 |
| 5.0 | 3.8 |
| 5.5 | 4.6 |
| 6.0 | 7.3 |
| 6.5 | 27.2 |
| 7.0 | 96.7 |
| 7.5 | 227.2 |

The foregoing description is illustrative and explanatory of preferred embodiments of the invention, and variations in the size, shape, materials an other details will become apparent to those skilled in the art. It is intended that all such variations and modifications which fall within the scope or spirit of the appended claims be embraced thereby.

What is claimed is:

1. A method for preparing a borehole in the earth to produce hydrocarbons therefrom, comprising:

drilling the borehole while circulating a mud therein which comprises a polysaccharide and optionally comprises finely divided solids dispersed therein to form a filtercake on surfaces of the borehole essentially free of oxidants and bromine and bromate generating agents; and introducing a filtercake removal fluid in the wellbore, in contact with a subterranean formation containing the hydrocarbons to be produced, for a duration effective to substantially remove the filtercake in the vicinity of the subterranean formation, wherein the filtercake removal fluid comprises a clear brine comprising a halide salt having a density of at least 1.08 g/cm$^3$ (9 lb/gal) and a bromine or bromate generating agent dissolved in the brine.

2. The method of claim 1 wherein the brine comprises a bromide salt and the agent dispersed in the brine comprises an oxidant in an amount effective to oxidize the bromide ion to bromine.

3. The method of claim 2 wherein the bromine generating agent is selected from bromates, chlorates, hypochlorites, permanganates, inorganic peroxides, peracids and combinations thereof.

4. The method of claim 2 wherein the oxidant is stable at ambient temperature and effective for delayed oxidation of the bromide ion to bromine at a temperature between 40° C. and 120° C.

5. The method of claim 1 wherein the brine is essentially free of bromide salt and the oxidant is a bromate or a bromate generating agent.

6. The method of claim 1 wherein the filtercake removal fluid comprises a surfactant to promote wetting of the filtercake.

7. The method of claim 1 wherein the brine comprises finely divided solids dispersed therein in an amount up to 200 kg/m$^3$.

8. The method of claim 1 wherein the brine comprises a halide salt of a metal selected from alkali metals, alkaline earth metals, transition metals and combinations thereof.

9. The method of claim 1 wherein the filtercake removal fluid comprises:
- a clear brine comprising a bromide salt of a metal selected from alkali metals, alkaline³ earth metals, transition metals and combinations thereof; and
- an oxidant dispersed in the brine in an amount effective for delayed oxidation of the bromide to bromine.

10. The method of claim 9 wherein
the oxidant is selected from bromates, chlorates, hypochlorites, permanganates, inorganic peroxides, peracids and combinations thereof.

11. The method of claim 9 wherein the brine comprises a mixture of chloride and bromide salts.

12. The method of claim 9 having a density of 1.44 g/ml or more.

13. The method of claim 9 wherein
the filtercake removal fluid comprises a surfactant to promote wetting of the filtercake.

14. The method of claim 9 wherein the filtercake removal fluid comprises finely divided solids dispersed in the brine in an amount up to 200 kg/m³.

15. The method of claim 9 wherein
the brine comprises a pH from about 3 to about 7.

16. The method of claim 1 further comprising installing gravel pack screens and tool assemblies into the borehole in advance of the introduction of the filtercake removal fluid, and introducing sand in a nonviscosified carrier into the borehole.

17. The method of claim 16 wherein the nonviscosified carrier for the sand comprises said filtercake removal fluid.

18. A method for preparing a borehole in the earth to produce hydrocarbons therefrom, comprising:
- drilling the borehole while circulating a mud therein which comprises a polysaccharide and optionally comprises finely divided solids dispersed therein to form a filtercake on surfaces of the borehole;
- thereafter installing gravel pack screens and tool assemblies into the borehole;
- thereafter introducing sand in a nonviscosified carried into the borehole; and
- introducing a filtercake removal fluid in the wellbore, in contact with a subterranean formation containing the hydrocarbons to be produced, for a duration effective to substantially remove the filtercake in the vicinity of the subterranean formation, wherein the filtercake removal fluid comprises a clear brine comprising a halide salt having a density of at least 1.08 g/cm³ (9 lb/gal) and a bromine or bromate generating agent dispersed in the brine.

19. The method of claim 18 wherein the nonviscosified carrier for the sand comprises said filtercake removal fluid.

20. A filtercake removal fluid for cleaning a borehole drilled in the earth, comprising:
- a clear brine comprising a bromide salt of a metal selected from alkali metals, alkaline earth metals, transition metals and combinations thereof, having a density of at least 1.08 g/cm³ (9 lb/gal), a pH from about 3 to about 7, and essentially free of iron;
- an oxidant dissolved in the brine in an amount effective for oxidation of the bromide to bromine at an elevated temperature between 40° C. and 120° C., wherein the oxidant is stable to essentially avoid free bromine formation at ambient temperatures.

* * * * *